(12) United States Patent
Brütt et al.

(10) Patent No.: US 11,091,134 B2
(45) Date of Patent: Aug. 17, 2021

(54) METHOD FOR BRAKE CONTROL OF A VEHICLE COMBINATION, AND VEHICLE COMBINATION FOR USE THEREWITH

(71) Applicant: WABCO GmbH, Hannover (DE)

(72) Inventors: Mirko Brütt, Ronnenberg (DE); Jakob Friedrich Schmidt, Hannover (DE)

(73) Assignee: ZF CV Systems Europe BV, Brussels (BE)

(\*) Notice: Subject to any disclaimer, the term of this patent is extended or adjusted under 35 U.S.C. 154(b) by 241 days.

(21) Appl. No.: 16/290,304

(22) Filed: Mar. 1, 2019

(65) Prior Publication Data

US 2019/0270436 A1 Sep. 5, 2019

(30) Foreign Application Priority Data

Mar. 3, 2018 (DE) ..................... 10 2018 001 695.2

(51) Int. Cl.
| | |
|---|---|
| *B60T 8/17* | (2006.01) |
| *B60T 7/20* | (2006.01) |
| *B60T 13/66* | (2006.01) |
| *B60T 13/68* | (2006.01) |
| *B60T 8/18* | (2006.01) |
| *B60T 8/24* | (2006.01) |

(52) U.S. Cl.
CPC .............. *B60T 8/1708* (2013.01); *B60T 7/20* (2013.01); *B60T 8/1887* (2013.01); *B60T 8/248* (2013.01); *B60T 13/662* (2013.01); *B60T 13/683* (2013.01); *B60T 2260/04* (2013.01)

(58) Field of Classification Search
CPC ...... B60T 8/1708; B60T 8/1887; B60T 8/248; B60T 7/20
See application file for complete search history.

(56) References Cited

U.S. PATENT DOCUMENTS

| | | | | |
|---|---|---|---|---|
| 6,012,781 | A * | 1/2000 | Gerum | B60T 7/20 303/22.4 |
| 6,273,522 | B1 * | 8/2001 | Feetenby | B60T 7/20 188/112 R |
| 9,311,761 | B1 * | 4/2016 | Ye | G07C 5/085 |
| 10,029,660 | B2 * | 7/2018 | Buchner | B60T 13/683 |

(Continued)

FOREIGN PATENT DOCUMENTS

| | | |
|---|---|---|
| DE | 4243245 A1 | 6/1994 |
| DE | 4438252 A1 | 5/1996 |

(Continued)

*Primary Examiner* — Thomas G Black
*Assistant Examiner* — Sara J Lewandroski
(74) *Attorney, Agent, or Firm* — Dickinson Wright PLLC

(57) ABSTRACT

A method for brake control of a vehicle combination (1) having a tractor vehicle (2) and a trailer vehicle (3) with an electrically controllable trailer control valve (9) changes an assigned trailer control valve characteristic curve (p_normal) stored in an electronic controller (6) for normal operation of the vehicle combination (1) or replaces it with a trailer control valve characteristic curve for special operation (p_special) in the event that a special operation of the vehicle combination (1) is detected or predicted, which special operation, under consideration of relevant parameters, differs from the normal operation or is evaluated as being potentially impermissible.

7 Claims, 2 Drawing Sheets

(56) References Cited

U.S. PATENT DOCUMENTS

| | | | |
|---|---|---|---|
| 2004/0119334 A1* | 6/2004 | Lenz | B60T 8/248 303/146 |
| 2004/0148085 A1* | 7/2004 | Heuer | B60T 8/1766 701/70 |
| 2007/0205656 A1* | 9/2007 | Bitter | B60T 11/108 303/7 |
| 2014/0180553 A1* | 6/2014 | Eckert | B60T 8/1708 701/70 |
| 2014/0180555 A1* | 6/2014 | Eckert | B60T 8/1708 701/79 |
| 2017/0368897 A1* | 12/2017 | Brickley | H04W 4/70 |
| 2018/0154874 A1* | 6/2018 | Kulkarni | H01M 4/8814 |
| 2018/0215358 A1* | 8/2018 | Hall | B60T 7/20 |
| 2019/0039582 A1* | 2/2019 | Shimizu | B60T 8/1708 |
| 2019/0202423 A1* | 7/2019 | Bongaerts | B60D 1/248 |

FOREIGN PATENT DOCUMENTS

| | | |
|---|---|---|
| DE | 10301096 A1 | 8/2004 |
| DE | 102013103068 A1 | 10/2014 |
| DE | 102014100069 A1 | 7/2015 |

* cited by examiner

METHOD FOR BRAKE CONTROL OF A VEHICLE COMBINATION, AND VEHICLE COMBINATION FOR USE THEREWITH

TECHNICAL FIELD

The present disclosure relates to a method for brake control of a vehicle combination consisting of a tractor vehicle and a trailer vehicle, the tractor vehicle having a brake-medium-actuated tractor vehicle brake system, and the trailer vehicle having a brake-medium-actuated trailer brake system, with an electrically controllable trailer control valve with at least one trailer control valve characteristic curve stored in an electronic controller for controlling a trailer brake pressure of the trailer brake system for a normal operation of the vehicle combination. The brake medium may be hydraulic fluid, pneumatic, for example in the form of pressurized air, or a combination of hydraulic and pneumatic media. Moreover, the present disclosure relates to a vehicle combination configured and equipped in such a way that the method can be operated on it.

BACKGROUND

In the case of the brake actuation of a vehicle combination, the brake pressure at the brakes of the trailer vehicle can be regulated by means of an electrically controllable trailer control valve. A trailer control valve of this type can be actuated in accordance with a characteristic curve placing the tractor vehicle brake pressure and the trailer brake pressure in a fixed, for example generally linear relationship. The trailer control valve characteristic curve is usually utilized for all operating situations.

The brake balancing between the tractor vehicle and the trailer vehicle is governed by a standard containing compatibility bands establishing a ratio between the brake action and the pressure at the coupling head of the tractor vehicle. In the case of some vehicle combinations, such as agricultural vehicle combinations, other off-highway vehicle combinations or trucks for heavy and special transport, brake balancing is often problematic, however, since combinations of this type of the tractor vehicle and the trailer vehicle can have very different masses during use and the coupling force between the vehicles can fluctuate greatly. If a vehicle combination additionally has a hydrostatic continuously variable automatic transmission, the vehicle combination can be retarded greatly solely by way of changing of the transmission ratio, for example by way of actuation of an operating lever or throttling back, without it being necessary for the service brake to be actuated to this end. The same applies in the case of active engine or sustained action brakes.

In the case of a non-actuated service brake, a deceleration of this type has the consequence that the trailer vehicle is not braked and is therefore pushed onto the tractor vehicle in a non-braked manner. In the case of incorrect brake balancing, it can occur that, in special driving states of this type, the actual brake action does not correspond to the stipulated brake action in the compatibility bands. This can lead to excessive coupling forces between the tractor vehicle and the trailer vehicle and, as a consequence, to the instability of the vehicle combination. In particular, what is known as "jackknifing" of the vehicle combination, which is dangerous in some circumstances, is feared in critical driving situations.

DE 42 43 245 A1 has disclosed a coupling force regulation means in the case of a vehicle combination, in the case of which coupling force regulation means the coupling force between a tractor vehicle and a trailer vehicle is determined and is adjusted to a setpoint coupling force. In this way, stability-optimized braking of a vehicle combination is to be ensured at all operating points.

DE 10 2013 103 068 A1 has disclosed a method, in the case of which a trailer brake of a vehicle combination is activated automatically if, in the case of a non-actuated friction brake of the tractor vehicle, a deceleration of the trailer vehicle is determined, which deceleration exceeds a predefined limit value.

DE 10 2014 100 069 A1 has disclosed a method for controlling a brake device of a tractor vehicle/trailer combination, the tractor vehicle having, for example, a continuously variable transmission, a trailer which is pushing onto the tractor vehicle being detected by way of an electronic control unit device with a vehicle control unit and an electropneumatic trailer control valve in a driving state with a non-actuated service brake, and a brake system of the trailer being actuated automatically in order to generate a brake force, in the case of a non-actuated service brake of the tractor vehicle, by way of the control unit device if a predefined pushing action of the trailer is reached or exceeded. The control unit device detects that the predefined pushing action of the trailer is reached or exceeded if a characteristic variable has reached, exceeded or undershot a predefined limit value which is assigned to it. The drive torque which is generated by a drive engine of the tractor vehicle, for example the torque at a crankshaft and/or the output torque at at least one driven wheel of the tractor vehicle, is used as a characteristic variable. The drive or output torque is monitored to check whether it undershoots a predefined limit torque because a deceleration of the tractor vehicle accompanies this.

SUMMARY

Against this background, the present disclosure was based on the object of proposing a method for brake control of a vehicle combination, by means of which method reliable braking of a trailer vehicle is ensured in all deceleration situations of the vehicle combination, and by means of which method at the same time comfortable brake balancing between the tractor vehicle and the trailer vehicle is achieved. In particular, in the case of off-highway vehicle combinations, such as an agricultural tractor vehicle/trailer combination or in the case of semitrailers or platform road trains for special transport which can be subjected to great coupling forces and spontaneous pronounced vehicle decelerations by way of the operation of a continuously variable automatic transmission in the drive train, an engine brake, a sustained action brake, and/or by way of a greatly different mass distribution between the tractor vehicle and the trailer vehicle, improved and more harmonic brake balancing is to be achieved.

This object is achieved by the finding that, in the case of a vehicle combination consisting of a tractor vehicle and a trailer vehicle, improved brake balancing between the two vehicles can be achieved if, instead of a fixed trailer control valve characteristic curve, variable characteristic curves for brake control of the trailer vehicle are used. Relevant parameters are to be taken into consideration in each case in those variable characteristic curves. As a result, it becomes possible to set and to vary the trailer brake pressure in such a way that running of the trailer vehicle onto the tractor vehicle and the depicted jackknifing can be counteracted rapidly. In particular, even when, for example, spontaneous vehicle decelerations occur as a result of setting of a transmission ratio or activating of an engine brake or sustained action brake, or high and fluctuating coupling forces act between the vehicles as a result of a great mass of the trailer in an agricultural application. As a result, adhering to the compatibility bands of the brake balancing at all times is simplified.

The present disclosure therefore proceeds from a method for brake control of a vehicle combination, consisting of a tractor vehicle and a trailer vehicle, the tractor vehicle having a pneumatic/hydraulic tractor vehicle brake system, and the trailer vehicle having a pneumatic/hydraulic trailer brake system, with an electrically controllable trailer control valve which is assigned at least one trailer control valve characteristic curve which is stored in an electronic controller for controlling a trailer brake pressure of the trailer brake system for normal operation of the vehicle combination.

In order to achieve the object which is set, the present disclosure provides that the trailer control valve characteristic curve which is stored for the normal operation of the vehicle combination varies in the case of a detection or prediction of special operation of the vehicle combination, which special operation differs from the normal operation or is evaluated as being potentially impermissible, with consideration of parameters which are relevant for this situation, or the trailer control valve characteristic curve is replaced by a trailer control valve characteristic curve for special operation.

Normal operation of the vehicle combination is understood to mean driving operation, in which, in the case of a deceleration of the vehicle combination on account of an actuation of a brake system of the tractor vehicle, the brake pressure regulation of the trailer vehicle takes place by means of a trailer control valve characteristic curve which is stored for the operation.

The method according to the present disclosure is based on the fact that the brake system of the trailer is actuated in a special operating situation with a brake pressure being varied with the aid of a characteristic curve particularly suitable for the situation. Reliable and comfortable braking of the trailer is achieved as a result. The type of brake control becomes possible by way of an electrically controlled trailer control valve, as is already present in many vehicle combinations. Existing sensor devices of the drive train of the vehicle combination can be used, where available, to carry out the method. Additional sensor devices are available on the market and can enhance the system as required. An existing electronic controller is to be adapted merely with regard to its computing algorithms for controlling an electrically controllable trailer control valve and possibly with regard to its storage capacity for storing characteristic curve data. It is to be noted at this point that the control characteristic curves or characteristic curve data are broadly speaking stored in the electronic controller in the form of tables or value pairs.

In normal operation of the vehicle combination, the use of a trailer control valve characteristic curve for brake control can preferably be provided as previously, where the trailer control valve characteristic curve depicts a profile of a tractor vehicle brake pressure of the tractor vehicle brake system in relation to a trailer brake pressure of the trailer brake system. As a result, advantageous basic balancing between the brake systems of the tractor vehicle and the trailer vehicle can be achieved in a simple way. The trailer control valve characteristic curve is then no longer fixed immutably for all operating situations, however. The present disclosure advantageously utilizes the possibility of varying the trailer control valve characteristic curve as required or of replacing it with another characteristic curve.

It can be provided in accordance with one embodiment of the method according to the present disclosure that the weight of the tractor vehicle, the weight of the trailer vehicle, a coupling force between the tractor vehicle and the trailer vehicle, and/or a brake pressure or an angular position of a trailer axle being force-steered or actively steered by way of a steering system of the trailer vehicle are/is detected, and that the trailer control valve characteristic curve for the normal operation is varied in a manner which is dependent on the detected value of at least one of the parameters, with the result that special operation of the vehicle combination which is evaluated as being potentially impermissible is avoided or is at least ended directly after it is detected.

In order to achieve harmonic brake balancing of a vehicle combination, for example in the case of an off-highway vehicle combination, such as an agricultural tractor vehicle/trailer combination or in the case of a semitrailer or platform road train for special transport, the present disclosure accordingly proposes to determine the coupling force between the tractor vehicle and the trailer vehicle, and to vary a trailer control valve characteristic curve in a manner which is dependent on the coupling force. The coupling force can be measured at the coupling point between the tractor vehicle and the trailer vehicle with the aid of a sensor, as used, for example, in power lifts for agricultural tractors.

The detected force can be a measure which influences the characteristic curve of the trailer control valve, which characteristic curve is to be varied and is finally to be used. A detected pushing force of the trailer vehicle would mean in this case that the pressure in the pneumatic control line of the trailer is to be raised to a defined higher-level, in order to brake the trailer vehicle in a more pronounced manner than up to now. A detected pulling force of the trailer vehicle would mean a case where the pressure in the pneumatic control line of the trailer is to be lowered to a defined lower level, with the result that the trailer vehicle is braked to a lesser extent than up to now. The weight and the weight distribution of the two vehicles in relation to one another can be used as an additional parameter. Accordingly, it is possible by way of the method to react directly to insufficient or uncomfortable brake balancing. The adaptation of the trailer control valve characteristic curve, in a manner which is dependent on the coupling force between the vehicles, can ensure harmonic brake balancing and can produce greater security against jackknifing of the vehicle combination.

Trailer vehicles for agricultural applications or for transporting heavy goods frequently have a pneumatic/hydraulic/mechanical steering system, for example a force-steered training axle, by way of which steering system one or more axles of the trailer vehicle is/are steered. In the case of a trailer vehicle of this type, the pneumatic/hydraulic pressure of the steering system or a current angular position of a steered axle can be determined by way of the abovementioned electronic controller. The current values of the parameters can be used during the determination of a pushing force of the trailer vehicle as an additional criterion for detecting a jackknifing risk of the vehicle combination in the case of a non-actuated tractor vehicle brake system. In this case, the trailer vehicle can be braked temporarily for a few seconds by means of a suitable trailer control valve characteristic curve, in order thus to prevent jackknifing of the combination.

It can be provided in accordance with another embodiment of the present disclosure that, in the case of a vehicle combination, the drive train of which has a hydrostatic continuously variable automatic transmission, a transmission output torque of the automatic transmission is determined continuously, that special operation of the vehicle combination which differs from the normal operation is detected when the vehicle combination is braked in a driving state with a non-actuated tractor vehicle brake system on account of a change of the transmission ratio of the automatic transmission, as a result of which the trailer vehicle is pushed onto the tractor vehicle, and that, for the case of the detected special operation, the trailer control valve characteristic curve for the normal operation is replaced by a trailer control valve characteristic curve for the special operation, in which the trailer brake pressure is varied as a function of the determined transmission output torque of the automatic transmission.

In order to always achieve reliable braking of the trailer vehicle of a vehicle combination, the present disclosure accordingly proposes, in situations if the vehicle combination is retarded and the brake system of the tractor vehicle is not actuated, to control the trailer brake pressure via the trailer control valve as a function of the transmission output torque of the continuously variable automatic transmission. The transmission output torque can be derived from existing data such as engine output torque, transmission ratio and degree of efficiency of the hydrostatic automatic transmission and/or from the pressure in the hydraulic system of the automatic transmission. The relationship between negative transmission output torque (that is to say, transmission output torque which acts in a braking manner in the driving situation) and trailer brake pressure can be derived from a trailer control valve characteristic curve which correlates the tractor vehicle brake pressure and the trailer brake pressure, with consideration of a further characteristic curve which correlates the tractor vehicle brake pressure and a determined wheel brake torque of the tractor vehicle. As a result, a balanced brake characteristic or driving dynamic is achieved, regardless of whether the driver retards the vehicle combination by way of the service brake or a change in the transmission ratio.

Moreover, it can be provided that the trailer brake pressure is controlled in a manner which is dependent on the transmission output torque of the automatic transmission if the determined transmission output torque has exceeded a predefined torque limit value in the direction of increasing vehicle deceleration.

In order to avoid the trailer brakes being actuated too frequently, it is advantageous to load the trailer brakes with a trailer brake pressure only when a defined negative transmission output torque threshold has been exceeded.

It can be provided in accordance with a further embodiment of the present disclosure that, in the case of a vehicle combination, the drive train of which has an engine brake, an engine brake torque is determined continuously, that special operation of the vehicle combination which differs from the normal operation is detected if the vehicle combination is braked in a driving state with a non-actuated tractor vehicle brake system on account of an engine brake torque, as a result of which the trailer vehicle is pushed onto the tractor vehicle, and in that, for the case of the detected special operation, the trailer control valve characteristic curve for the normal operation is replaced by a trailer control valve characteristic curve for the special operation, in which the trailer brake pressure is varied as a function of the detected engine brake torque. As a result, in the case of a significant deceleration of the vehicle combination during driving operation by way of the engine brake, reliable braking of the trailer is ensured.

Another development of the method according to the present disclosure provides that, in the case of a vehicle combination, the drive train of which has a sustained action brake, a sustained action brake torque is detected continuously, that special operation of the vehicle combination which differs from the normal operation is detected if the vehicle combination is braked in a driving state with a non-actuated tractor vehicle brake system on account of a sustained action brake torque, as a result of which the trailer vehicle is pushed onto the tractor vehicle, and that, for the case of the detected special operation, the trailer control valve characteristic curve for the normal operation is replaced by a trailer control valve characteristic curve for the special operation, in which the trailer brake pressure is varied as a function of the detected sustained action brake torque. As a result, in the case of a significant deceleration of the vehicle combination during driving operation by way of the sustained action brake, reliable braking of the trailer is ensured.

The described embodiments of the present disclosure can also be combined with one another. It is thus possible, for example, in the case of a vehicle combination with a continuously variable automatic transmission, to measure both the transmission output torque of the transmission and the coupling force between the tractor vehicle and the trailer vehicle, and to accordingly adapt a trailer control valve characteristic curve which has been used up to now or to replace it with a suitable trailer control valve characteristic curve. The advantage of the method according to the present disclosure is a balanced brake characteristic or vehicle dynamic, regardless of whether the driver retards the vehicle combination by way of the service brake or by way of the transmission, engine or a sustained action brake.

Finally, the present disclosure also relates to a vehicle combination, such as an agricultural tractor vehicle/trailer combination, semitrailer or platform road train, having an electronically controlled trailer control valve, having an electronic controller for controlling the trailer control valve, having an electronic memory for storing trailer control valve characteristic curves, and having sensor means for detecting relevant parameters, such as a transmission output torque of a hydrostatic continuously variable automatic transmission, the weight of the tractor vehicle and of the trailer vehicle, a coupling force between the two vehicles, and/or an angular position of a steered trailer axle, so that the electronic controller is configured to carry out the method for brake control of the vehicle combination as described above.

BRIEF DESCRIPTION OF THE DRAWINGS

The present disclosure will be further described by way of an exemplary embodiment shown in the appended drawings. In the drawings.

The drawings are included herewith for purely illustrative purposes and are not intended to limit the scope of the present invention.

DETAILED DESCRIPTION

Figure 1:
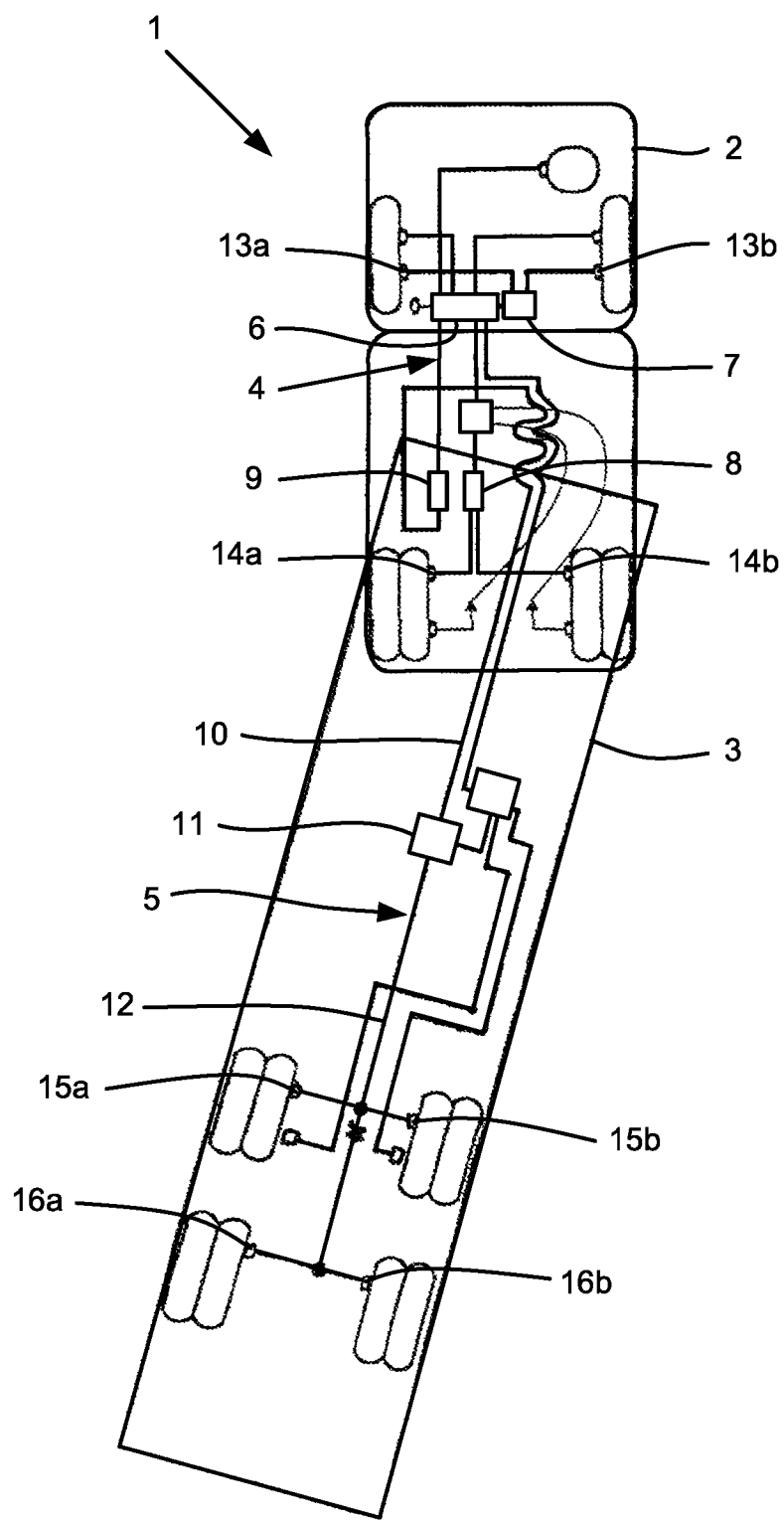
FIG. 1 shows a diagrammatic plan view of a vehicle combination.

FIG. 1 shows by way of example a vehicle combination 1 which is known from DE 103 01 096 A1 and on which the method in accordance with the present disclosure can be carried out. The vehicle combination 1 consists of a tractor vehicle 2, to which a trailer vehicle 3 is coupled. The tractor vehicle 2 has a tractor vehicle brake system 4 for braking the tractor vehicle 2. The trailer vehicle 3 has a trailer brake system 5 for braking the trailer vehicle 3. The two brake systems 4, 5 can be actuated as part of a brake system by way of pressure medium such as compressed air or pressurized oil. The construction of a brake system of this type is described in DE 103 01 096 A1 which is cited above. The following description is restricted to the components of the brake system which are relevant for the present disclosure.

Accordingly, an electronic controller 6 which serves to control different brake functions of the vehicle combination 1 is arranged in the tractor vehicle 2. The electronic controller 6 is connected electrically to a front axle valve 7 of the tractor vehicle brake system 4 for controlling the brake pressure in the wheel brakes 13a, 13b of the front wheels and to a rear axle valve 8 of the tractor vehicle brake system 4 for controlling the brake pressure in the wheel brakes 14a, 14b of the rear wheels of the tractor vehicle 2. Moreover, the electronic controller 6 is connected electrically to an electrically controllable trailer control valve 9 for controlling the brake pressure in the wheel brakes 15a, 15b, 16a, 16b of the trailer vehicle 3. The trailer control valve 9 is connected in a manner which conducts pressure medium via a first brake line 10 to a further valve which is configured as a trailer axle valve 11 and is not of significance here. The trailer axle valve 11 is connected in a manner which conducts pressure medium via a second brake line 12 to the wheel brakes 15a, 15b, 16a, 16b of the trailer vehicle 3. The brake lines 10, 12 for the wheel brakes 15a, 15b, 16a, 16b of the trailer vehicle 3 can be loaded with brake pressure via the trailer control valve 9. As described in the following text, the trailer brake pressure p_trailer can be controlled and varied by means of the electronic controller 6 and the trailer control valve 9. The brake control of the trailer vehicle 3 takes place in a manner which is controlled by characteristic curves in accordance with the present disclosure.

Moreover, the vehicle combination 1 has various sensors for vehicle dynamics control and for an anti-lock brake system, such as wheel rotational speed sensors, steering angle sensors, transverse acceleration sensors and yaw rate sensors, and associated connecting lines which signal-connect the sensors to the electronic controller 6. The components are shown in the vehicle combination 1 in accordance with FIG. 1, but are not provided with designations and do not have to be described further.

Figure 2:
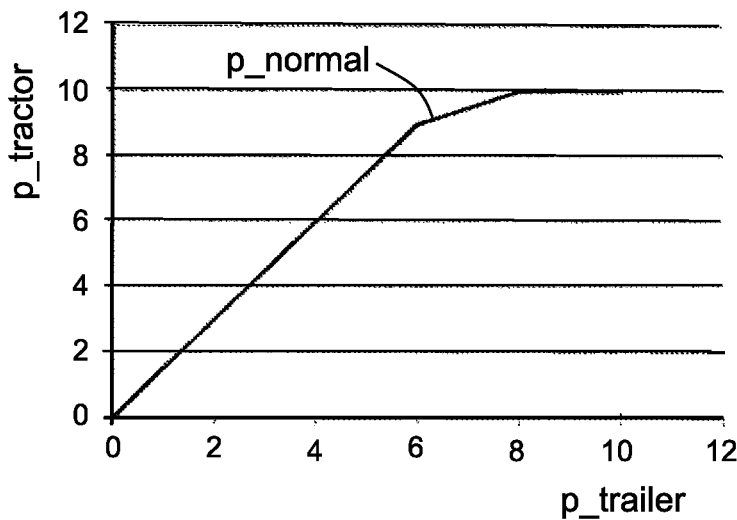
FIG. 2 shows a trailer control valve characteristic curve for normal operation of a vehicle combination according to FIG. 1.

FIG. 2 shows a trailer control valve characteristic curve p_normal for normal operation of the vehicle combination 1 in accordance with FIG. 1. In the characteristic curve, the brake pressure p_tractor of the tractor vehicle 2 is plotted against the brake pressure p_trailer of the trailer vehicle 3. The trailer control valve characteristic curve p_normal runs approximately in a linear manner until a maximum system pressure which is 10 pressure units here, for example, is reached. If the drive train of the vehicle combination 1 has a continuously variable automatic transmission, however, the vehicle combination can be retarded in driving operation on account of a change of a transmission ratio of the continuously variable automatic transmission and without actuating the service brake of the tractor vehicle 2. For example, the driver can influence (and use in a targeted manner) the possibility of vehicle braking by means of an operating lever or by way of throttling back. In this case, the trailer control valve characteristic curve p_normal for normal operation does not supply a trailer brake pressure p_trailer, and the trailer vehicle 3 would run onto the tractor vehicle 2 in an un-braked manner. This situation is detected as special operation by the electronic controller 6.

Figure 4:
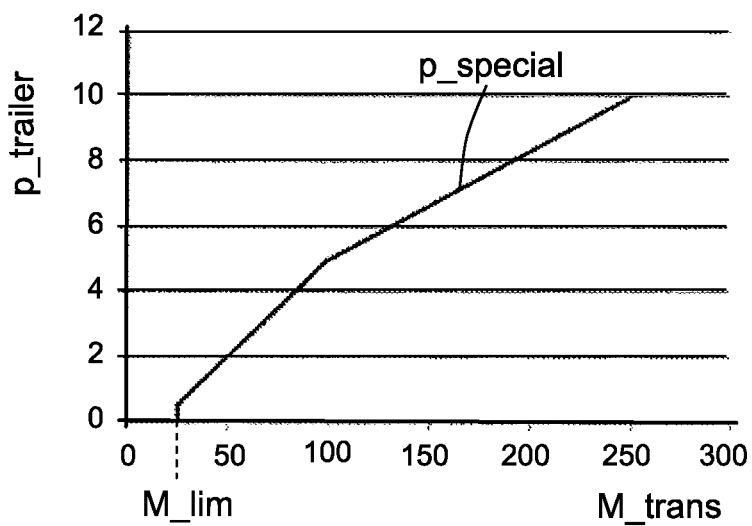
FIG. 4 shows a trailer control valve characteristic curve for special operation of the vehicle combination according to FIG. 1.

FIG. 4 shows a novel trailer control valve characteristic curve p_special for the special operation, which novel trailer control valve characteristic curve p_special is used by the electronic controller 6 for the brake control of the trailer vehicle 3. The diagram according to FIG. 4 shows the trailer control valve characteristic curve for the special operation p_special which specifies the dependence of the brake pressure p_trailer of the trailer vehicle 3 on the transmission output torque M_trans of the automatic transmission.

Figure 3:
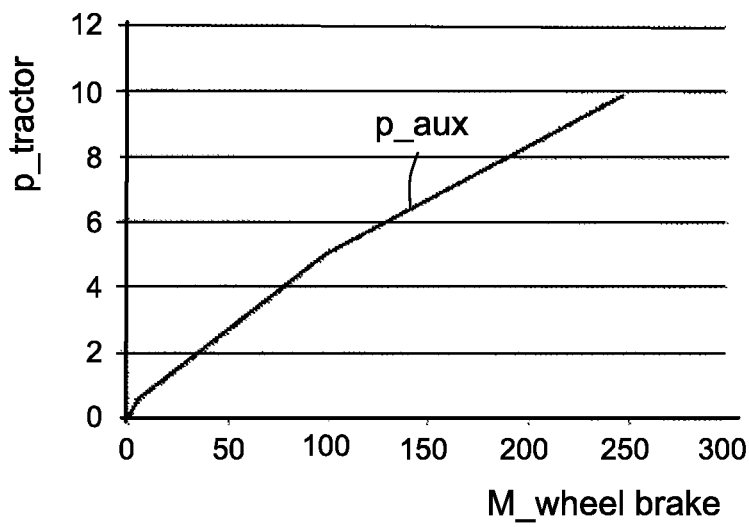
FIG. 3 shows a wheel brake torque characteristic curve of the tractor vehicle according to FIG. 1.

The trailer control valve characteristic curve p_special is derived from the trailer control valve characteristic curve p_normal (shown in FIG. 2) for normal operation and an auxiliary characteristic curve p_aux which is shown in FIG. 3 and in which the tractor vehicle brake pressure p_tractor is plotted against the wheel brake torque M_wheel brake of the tractor vehicle 2. The wheel brake torque M_wheel brake of the tractor vehicle 2 is measured during driving operation and correlates clearly here with the transmission output torque M_trans.

According to the diagram in FIG. 4, the control of the trailer brake pressure p_trailer logically starts only from a lower torque limit value M_lim which results in a significant vehicle deceleration with pushing on of the trailer vehicle 3. With the aid of the trailer control valve characteristic curve p_special for special operation, the trailer vehicle 3 is braked reliably if the vehicle combination 1 is retarded on account of a transmission ratio change without actuation of the service brake, and the trailer control valve characteristic curve p_normal for the normal operation is therefore not active.

Analogous trailer valve characteristic curves for special operation can be derived for the output torque of an engine brake or the output torque of a sustained action brake of the tractor vehicle 2, and can be used for the brake control of the trailer vehicle 3.

In the case of a further exemplary embodiment which is not described in greater detail here, a similar trailer control valve characteristic curve can be derived and used for the brake control of the trailer vehicle 3 in the case of a detection of a coupling force between vehicles 2, 3.

LIST OF DESIGNATIONS (INTEGRAL PART OF THE DESCRIPTION)

1 Vehicle combination
2 Tractor vehicle
3 Trailer vehicle
4 Tractor vehicle brake system
5 Trailer brake system
6 Electronic controller
7 Front axle valve
8 Rear axle valve
9 Trailer control valve
10 First brake line
11 Trailer axle valve
12 Second brake line
13a, 13b Front axle wheel brakes
14a, 14b Rear axle wheel brakes
15a, 15b First trailer axle wheel brakes
16a, 16b Second trailer axle wheel brakes M_lim Torque limit value
M_trans Transmission output torque
M_wheel brake Wheel brake torque
p_aux Auxiliary characteristic curve
p_normal Trailer control valve characteristic curve for normal operation
p_special Trailer control valve characteristic curve for special operation
p_tractor Tractor vehicle brake pressure
p_trailer Trailer brake pressure While the above description constitutes the preferred embodiments of the present invention, it will be appreciated that the invention is susceptible to modification, variation and change without departing from the proper scope and fair meaning of the accompanying claims.

The invention claimed is:

1. A method for brake control of a vehicle combination (1) including a tractor vehicle (2) and a trailer vehicle (3), the tractor vehicle (2) having a brake-medium-operated tractor vehicle brake system (4), and the trailer vehicle (3) having a brake-medium-operated trailer brake system (5), with an electrically controllable trailer control valve (9) having at least one trailer control valve characteristic curve (p_normal) stored in an electronic controller (6) for controlling a trailer brake pressure (p_trailer) of the trailer brake system (5) for a normal operation of the vehicle combination (1), the method comprising the following steps:
detecting or predicting a special operation of the vehicle combination (1) by consideration of relevant parameters, wherein the special operation differs from the normal operation or is determined to be potentially impermissible in view of the relevant parameters; and
varying the trailer control valve characteristic curve (p_normal) for the normal operation or replacing the trailer control valve characteristic curve (p_normal) for the normal operation with a trailer control valve characteristic curve for the special operation (p_special),
wherein the tractor vehicle (2) has a tractor weight and the trailer vehicle has a trailer weight,
wherein the relevant parameters comprise at least one of the tractor weight, the trailer weight, a coupling force between the tractor vehicle (2) and the trailer vehicle (3), the trailer brake pressure, and an angular position of a trailer axle, wherein the trailer axle is force-steered or is actively steered by way of a steering system of the trailer vehicle (3), and
wherein the trailer control valve characteristic curve (p_normal) for the normal operation is varied in a manner dependent on at least one of the relevant parameters,
wherein, upon determination that the special operation of the vehicle combination (1) is potentially impermissible, the special operation is prevented or is terminated immediately after the determination.

2. The method as claimed in claim 1, wherein the trailer control valve characteristic curve for the normal operation (p_normal) of the vehicle combination (1) specifies a profile of a tractor vehicle brake pressure (p_tractor) of the tractor vehicle brake system (4) in relation to the trailer brake pressure (p_trailer) of the trailer brake system (5).

3. A vehicle combination (1), comprising:
a tractor vehicle;
a trailer vehicle,
a brake system of the vehicle combination having
an electronically controlled trailer control valve (9) with an electronic controller (6) for controlling the trailer control valve (9),
an electronic memory for storing trailer control valve characteristic curves (p_normal, p_special, p_aux),
sensors for detecting relevant parameters including at least one of:
a transmission output torque (M_trans) of a hydrostatic continuously variable automatic transmission, a tractor weight, a trailer weight, a coupling force between the tractor vehicle and the trailer vehicle (2, 3), and an angular position of a steered trailer axle, and
an electronic controller, wherein the electronic controller is configured to carry out the method for brake control of the vehicle combination (1) as claimed in claim 1.

4. A method for brake control of a vehicle combination (1) including a tractor vehicle (2) and a trailer vehicle (3), the tractor vehicle (2) having a brake-medium-operated tractor vehicle brake system (4), and the trailer vehicle (3) having a brake-medium-operated trailer brake system (5), with an electrically controllable trailer control valve (9) having at least one trailer control valve characteristic curve (p_normal) stored in an electronic controller (6) for controlling a trailer brake pressure (p_trailer) of the trailer brake system (5) for a normal operation of the vehicle combination (1), the method comprising the following steps:
detecting or predicting a special operation of the vehicle combination (1) by consideration of relevant parameters, wherein the special operation differs from the normal operation or is determined to be potentially impermissible in view of the relevant parameters; and
varying the trailer control valve characteristic curve (p_normal) for the normal operation or replacing the trailer control valve characteristic curve (p_normal) for the normal operation with a trailer control valve characteristic curve for the special operation (p_special),
wherein the vehicle combination (1) has a drive train with a hydrostatic continuously variable automatic transmission, comprising the steps of:
continuously determining a transmission output torque (M_trans) of the automatic transmission,
detecting a special operation of the vehicle combination (1) different than the normal operation when the tractor vehicle is braked in a driving state with a non-actuated tractor vehicle brake system (4) due to a change of a transmission ratio of the automatic transmission, with the trailer vehicle (3) being pushed onto the tractor vehicle (2), and
replacing the trailer control valve characteristic curve for the normal operation (p_normal) with a trailer control valve characteristic curve for the special operation (p_special), in which the trailer brake pressure (p_trailer) is varied as a function of the determined transmission output torque (M_trans) of the automatic transmission.

5. The method as claimed in claim 4, wherein the trailer brake pressure (p_trailer) is controlled based on the transmission output torque (M_trans) of the automatic transmission when the determined transmission output torque (M_trans) has exceeded a predefined torque limit value (M_lim) toward an increasing vehicle deceleration.

6. A method for brake control of a vehicle combination (1) including a tractor vehicle (2) and a trailer vehicle (3), the tractor vehicle (2) having a brake-medium-operated tractor vehicle brake system (4), and the trailer vehicle (3) having a brake-medium-operated trailer brake system (5), with an electrically controllable trailer control valve (9) having at least one trailer control valve characteristic curve (p_normal) stored in an electronic controller (6) for controlling a trailer brake pressure (p_trailer) of the trailer brake system (5) for a normal operation of the vehicle combination (1), the method comprising the following steps:

detecting or predicting a special operation of the vehicle combination (1) by consideration of relevant parameters, wherein the special operation differs from the normal operation or is determined to be potentially impermissible in view of the relevant parameters; and varying the trailer control valve characteristic curve (p_normal) for the normal operation or replacing the trailer control valve characteristic curve (p_normal) for the normal operation with a trailer control valve characteristic curve for the special operation (p_special), wherein the tractor vehicle includes a drive train with an engine brake, the method further comprising the following steps:

continuously determining an engine brake torque;

detecting the special operation of the vehicle combination (1) which differs from the normal operation when the tractor vehicle is braked by an engine brake torque with a non-actuated tractor vehicle brake system (4), which causes the trailer vehicle (3) to be pushed onto the tractor vehicle (2); and replacing the trailer control valve characteristic curve for the normal operation (p_normal) with the trailer control valve characteristic curve for the special operation (p_special), in which the trailer brake pressure (p_trailer) is varied as a function of the detected engine brake torque.

7. A method for brake control of a vehicle combination (1) including a tractor vehicle (2) and a trailer vehicle (3), the tractor vehicle (2) having a brake-medium-operated tractor vehicle brake system (4), and the trailer vehicle (3) having a brake-medium-operated trailer brake system (5), with an electrically controllable trailer control valve (9) having at least one trailer control valve characteristic curve (p_normal) stored in an electronic controller (6) for controlling a trailer brake pressure (p_trailer) of the trailer brake system (5) for a normal operation of the vehicle combination (1), the method comprising the following steps:

detecting or predicting a special operation of the vehicle combination (1) by consideration of relevant parameters, wherein the special operation differs from the normal operation or is determined to be potentially impermissible in view of the relevant parameters; and varying the trailer control valve characteristic curve (p_normal) for the normal operation or replacing the trailer control valve characteristic curve (p_normal) for the normal operation with a trailer control valve characteristic curve for the special operation (p_special), wherein the tractor vehicle includes a drive train with a sustained-action brake, the method further comprising the following steps:

continuously detecting a sustained-action brake torque;

detecting the special operation of the vehicle combination (1) which differs from the normal operation when the vehicle combination (1) is braked by a sustained-action brake torque with a non-actuated tractor vehicle brake system, which causes the trailer vehicle (3) to be pushed onto the tractor vehicle (2); and replacing the trailer control valve characteristic curve for the normal operation (p_normal) with the trailer control valve characteristic curve for the special operation (p_special), in which the trailer brake pressure (p_trailer) is varied as a function of the detected sustained-action brake torque.

\* \* \* \* \*